United States Patent [19]

Shin

[11] Patent Number: 5,889,841
[45] Date of Patent: Mar. 30, 1999

[54] MODEM WITH NOISE ELIMINATING CIRCUIT

[75] Inventor: Seong-Kee Shin, Suwon, Rep. of Korea

[73] Assignee: SamSung Electronics Co., Ltd., Kyungki-do, Rep. of Korea

[21] Appl. No.: 785,021

[22] Filed: Jan. 17, 1997

[30] Foreign Application Priority Data

Jan. 17, 1996 [KR] Rep. of Korea ...................... 1996 817

[51] Int. Cl.$^6$ ................................................. H04M 11/00
[52] U.S. Cl. ........................ 379/93.01; 379/373; 375/222; 375/346
[58] Field of Search ................................ 379/96, 93.01, 379/93.09, 373; 375/222, 285, 346; 307/234, 443, 520, 542.1; 341/143, 136, 118, 144; 348/607

[56] References Cited

U.S. PATENT DOCUMENTS

| | | | |
|---|---|---|---|
| 4,883,993 | 11/1989 | Confalonieri et al. | 307/542.1 |
| 4,903,282 | 2/1990 | Botker | 377/7 |
| 4,958,158 | 9/1990 | Hashizume | 341/143 |
| 5,361,296 | 11/1994 | Reyes et al. | 379/96 |
| 5,369,402 | 11/1994 | Kwon | 341/136 |
| 5,572,549 | 11/1996 | Shimomura et al. | 375/285 |

*Primary Examiner*—Krista Zele
*Assistant Examiner*—Shih-Wen Hsieh
*Attorney, Agent, or Firm*—Robert E. Bushnell, Esq.

[57] ABSTRACT

A modem connected to a telephone line and capable of preventing noise from being generating upon the modem being powered-on or reset includes a ring detector for receiving a ring signal associated with an incoming telephone call through the telephone line and converting the ring signal to a binary ring signal; a datapump for processing the incoming telephone call; a controller coupled to the datapump and responsive to the ring detector, for generating an off-hook signal upon the ring signal to be detected, the off-hook signal including a leading portion of a pulse type constituting noise; a noise eliminating circuit for eliminating the leading portion of a pulse type included in the off-hook signal; and a modem driver for driving the modem in response to the off-hook signal from the noise eliminating circuit to cause a remote computer to communicate with a local computer connected to the modem or to switch a calling telephone to communicate with a called telephone. By the use of the modem, an off-hook signal constituting noise can be eliminated, the noise occurring instantly upon the modem being powered-on or reset. Therefore, no noise is introduced into the telephone line while the telephone of one calling subscriber is connected to the telephone of a called subscriber.

8 Claims, 5 Drawing Sheets

MODEM WITH NOISE ELIMINATING CIRCUIT

CLAIM OF PRIORITY

This application claims all benefits accruing under 35 U.S.C. §119 from an application for MODEM WITH NOISE PRE VENTING CIRCUIT earlier filed in the Korean Industrial Property Office on 17 Jan. 1996 and there duly assigned Ser. No. 817/1996.

BACKGROUND OF THE INVENTION

Field of the Invention

The present invention relates to a modem circuit with a noise eliminating circuit, and more particularly to a modem capable of preventing noise from being generating upon the modem being powered on or reset.

Description of the Related Art

Modems are interface device coupled between a data terminal and a telephone line. The data terminal maybe a personal computer. The modem permits the exchange of digital data with a remote modem-supported data terminal over the telephone line by providing an interface function between each terminal and the telephone network. To support the transmission of digital data to the remote terminal, the modem transforms the digital data from the local data terminal into analog form necessary for telephone line transmission. On the receiving end, a second modem transforms the received analog signals into digital data which is provided to its state of terminal.

Modems typically have four major sections consisting of a telephone interface, a data terminal interface, a controller, and a datapump. The telephone interface connects the telephone to the modem and typically includes a ring detector which sends digital information to the controller and a data access arrangement (DAA) for transmitting analog information between the telephone line and the modem's datapump. The data terminal interface links the modems to the local data terminal.

The controller executes the program for directing the functions of the modem and may decompress data coming from the datapump before sending it to the data terminal interface.

When a remote modem on the remote terminal is directed to communicate with a local modem, the remote modem dials the telephone number of the local modem and the telephone network then provides a ring signal to the local modem corresponding to an incoming telephone call. The local modem senses the ring signal by means of the ring detector and answers the incoming telephone call such that a data link is established between the two modems over the telephone line.

In such a modem, while the telephone of the caller is connected to the telephone of the called, if the modem for data communication which is connected to the called telephone is powered-on or reset, the controller is reset. Then, an off-hook signal of a pulse type constituting noise, is generated by the controller and is supplied to a modem driver, causing the modem to be instantly switched. As a result, the impedance on the telephone line is changed and an audible noise is output to both the calling and the called telephones during the change of impedance.

Furthermore, while the calling telephone is not connected to the called telephone but a ringing signal coming from the telephone network is supplied to the data terminal to cause a bell to ring, if the modem connected to the called telephone is powered-on or reset, the remote terminal attempts to communicate with the data terminal even though the modem is not in a normal operation state. This is due to the fact that when the modem is powered-on or reset, an off-hook signal of a pulse type constituting noise is generated by the controller of the modem and the remote terminal receives the noise signal through the telephone line and erroneously recognizes that the modem is in a normal operation state and attempts to communicate with the modem. However, since the modem has not detected a normal ringing signal from the ring detector and is not in a normal operation state, the modem can not recognize a command from the remote terminal and as a result, the data terminal can not receive data transmitted from the remote terminal.

The patent to Confalonieri et al., U.S. Pat. No. 4,883,993, entitled Antibounce Circuit For Digital Circuits, discloses an antibouce circuit for digital circuits which utilizes a delay to eliminate the leading and trailing portions of a pulse having erroneous noise components at the leading and trailing edges thereof.

Similarity, the patent to Shimomura et al, U.S. Pat. No. 5,572,549, entitled Noise Cancel Circuit Capable Of Canceling Noise From A Pulse Signal, also discloses the deletion of leading and trailing portions of a pulse to eliminate noise components contained therein.

The patent to Hashizume et al., U.S. Pat. No. 4,958,158, entitled Modem With Noise-Reducing Decoder In Demodulation Of Encoded Binary Pulse Signals Representative Of Constant Amplitude Signals, discloses a modem with a noise reducing decoder which includes a 1-click delay circuit used to reduce input noise.

The patent to Bocker, U.S. Pat. No. 4,903,282, entitled Electronic Coin-Counting Control, discloses an electronic coin-counting control circuit which provides a time delay when a pulse train is first received so as to eliminate extraneous noise contained in the beginning of the pulse train.

Lastly, the patent to Kwon, U.S. Pat. No. 5,369,402 entitled Digital/Analog Converter Circuit Utilizing Compensation Circuitry, discloses a digital to analog converter circuit which utilizes compensation circuitry to eliminate extraneous noise.

While all of the aforecited patents disclose features in common with the present invention, none of the patents teaches or suggests the specific combination of elements of the present invention.

SUMMARY OF THE INVENTION

It is therefore an object of the present invention to provide a modem which can eliminate an off-hook signal of a pulse type occurring instantly upon the modem being powered on or reset.

It is another object of the present invention to provide a modem which can eliminate noise occurring instantly when the modem is being reset while the telephone of one calling subscriber is connected to the telephone of a called subscriber.

It is a further object of the present invention to provide a modem which can prevent an off-hook signal of a pulse type from occurring instantly when the modem is being powered-on or reset and is not in a normal operation state.

According to an aspect of the present invention, a modem connected to a telephone line may be constructed with a ring detector for receiving a ring signal associated with an incoming telephone call through the telephone line and for converting the ring signal to a binary ring signal; a datapump for processing the incoming telephone call; a controller coupled to the datapump and responsive to the ring detector, for generating an off-hook signal upon the ring signal being detected by said ring detector, said off-hook signal including a leading portion of a pulse type constituting noise; a noise eliminating circuit for eliminating the leading portion of a pulse type included in said off-hook signal; and a modem driver for driving the modem in response to the noise eliminated off-hook signal from said noise eliminating circuit to cause a remote computer to communicate with a local computer connected to the modem or to switch a remote calling telephone to communicate with a local called telephone. By the use of this modem, an off-hook signal constituting noise, which occurs instantly upon the modem being powered-on or reset can be eliminated. Therefore, no audible noise is introduced into the telephone line while the telephone of one calling subscriber is connected to the telephone of a called subscriber.

In one embodiment of the present invention, the noise eliminating circuit may be constructed with a circuit for delaying the off-hook signal during a predetermined time period so as not to allow the leading portion of a pulse type to be supplied to the modem driver. The noise eliminating circuit also comprises a first inverter for inversely changing a polarity of the off-hook signal from the controller, an integrator for generating an integration signal based on a source voltage, a second inverter for inversely changing a polarity of the integration signal, and a logic circuit for eliminating the leading portion included in the off-hook signal during a predetermined time period in response to outputs of the first and second inverters.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
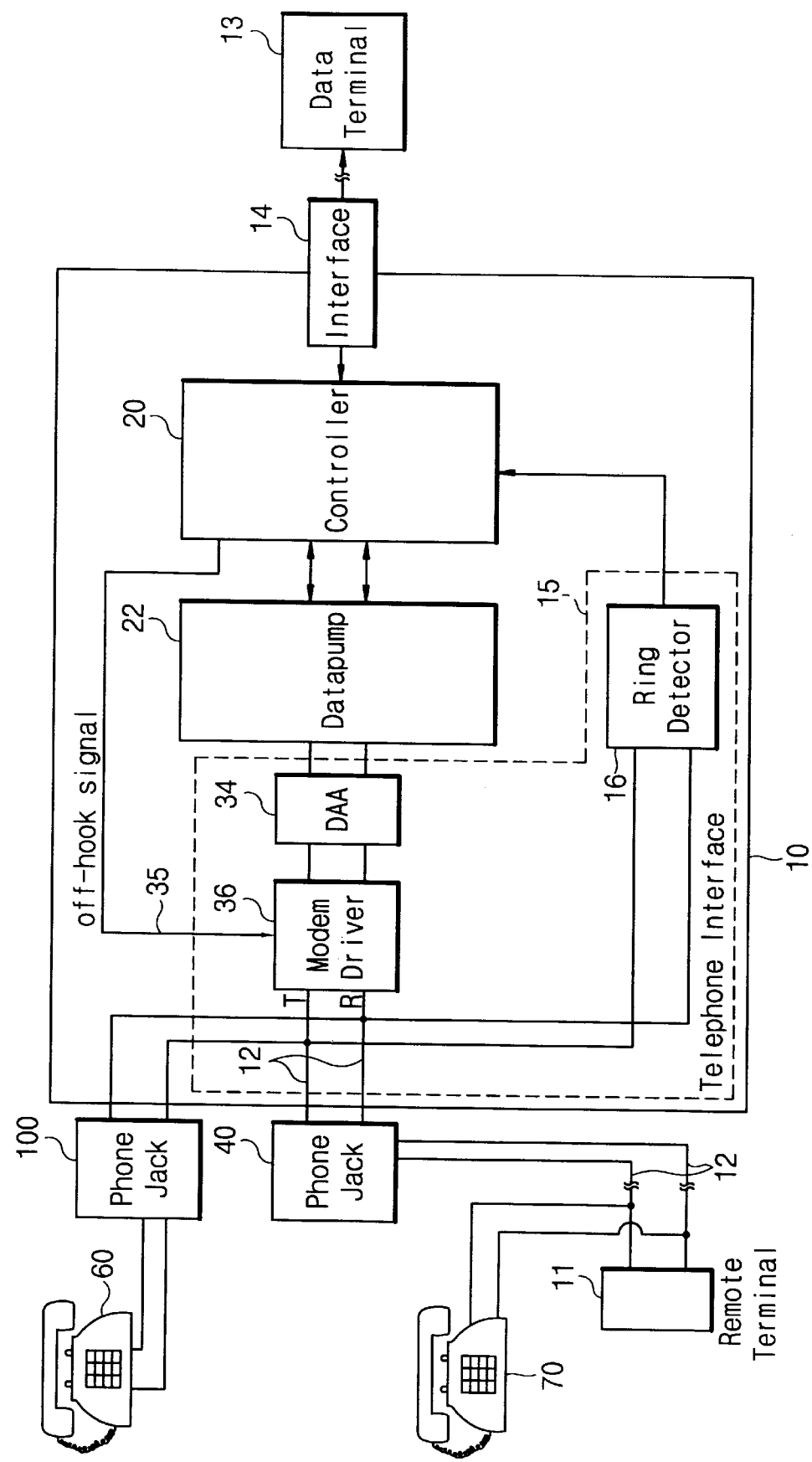
FIG. 1 is a block diagram of an earlier modem which is an interface device connected to a data terminal and a telephone line.

FIG. 1 is a block diagram of an earlier modem which is an interface device coupled between a data terminal and a telephone line. The data terminal 13 may be a personal computer. The modem 10 permits the exchange of digital data with a remote modem-supported data terminal 11 over the telephone line 12 by providing an interface function between each terminal and the telephone network. The modem 10 is typically plugged into a telephone jack 40 connected to a telephone line 12 and is positioned inside or adjacent to the associated data terminal 13. To support the transmission of digital data to the remote terminal, 11, the modem 10 transforms the digital data from the data terminal 13 into analog form necessary for telephone line transmission. On the receiving end, a second modem transforms the received analog signals into digital data which is provided to its data terminal.

As shown in FIG. 1, the modem has four major sections, for example, a telephone interface 15, a data terminal interface 14, a controller 20, and a datapump 22. The telephone interface 15 connects the telephone line 12 to the modem 10 and optionally to a local communications device such as a telephone 60 or an answering machine via another phone jack 100. The telephone interface 15 typically includes a ring detector 16 which sends digital information to the controller 20 and a data access arrangement (DAA) 34 for transmitting analog information between the telephone line 12 and the modem's datapump 22. The data terminal interface 14 links the modem 10 to the local data terminal 13 and is typically a serial interface for an external modem and a parallel interface for an internal modem installed inside the personal computer.

The controller 20 executes a program for directing the functions of the modem 10. The controller 20 may compress data coming from the data terminal interface 14 before sending it to the datapump 22 and may decompress data coming from the datapump 22 before sending it to the data terminal interface 14. Also, it is through commands to and responses from the controller 20 that the data terminal 13 has access to the configurational features of the modem 10. The datapump selection is typically configured by the controller 20 to process data between analog and digital signals in accordance with a data protocol.

The datapump 22 may convert digital data from the data terminal interface 14 into analog signals sent through the telephone interface 15 to the telephone line 12, or convert analog signals received from the telephone line 12 via the telephone interface 15 into digital data transmitted through the data terminal interface 14 or stored in the datapump 22 or controller 20, or simultaneously do both types of conversion in a "full duplex" mode. The datapump 22 may, for example, be capable of being configured to process data in accordance with a facsimile protocol or a data protocol. Note that although the term "modem" originates from modulator/demodulator, there is also a voice modem, in which modulation is not required. As such, the datapump 22 may also be capable of being configured to process data in accordance with a voice protocol. The datapump's facsimile, data, and voice protocols may be set to varying speeds and modes.

When a remote modem on the remote terminal 11 is directed to communicate with the local modem 10 connected to the data terminal 13, the remote modem dials the telephone number of the local modem 10. The telephone network (not shown) then provides a ring signal to the local modem 10 corresponding to an incoming telephone call. The local modem 10 senses the ring signal by means of the ring detector 16 and answers the incoming telephone call such that a data link is established between the two modems over the telephone line 12.

Figure 2:
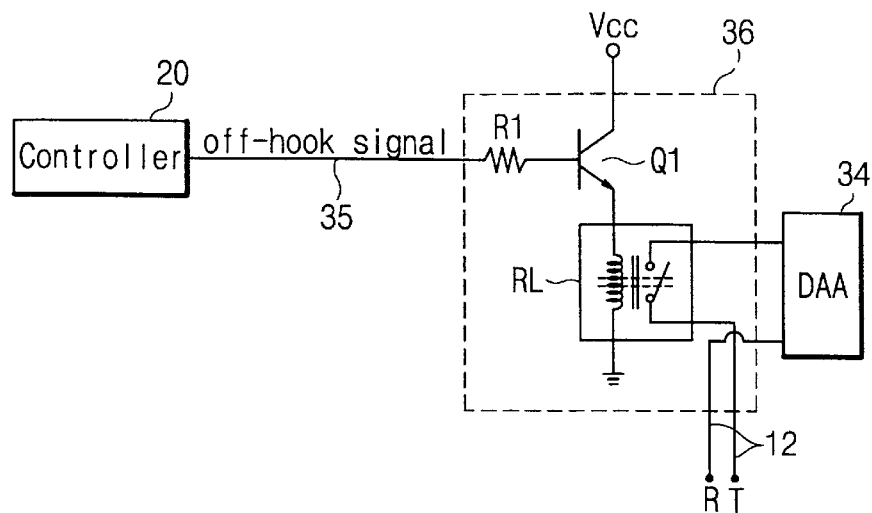
FIG. 2 is a detailed partial circuit diagram of the telephone interface shown in FIG. 1.

In the modem having the above construction, while the telephone 70 of the caller is connected to the telephone 60 of the called, if the modem 10 for data communication, which is connected to the called telephone 60, is powered on or reset, the controller 20 is reset. Then, an off-hook signal of a pulse type, constituting noise, is instantly generated by the controller 20. The off-hook signal from the controller 20, as shown in FIG. 2, is supplied through a resistor R1 to the base of a transistor Q1 and thus causes the modem driver 36 for driving the modem to be instantly switched. As a result, the impedance on the telephone line 12 is changed, and an audible noise is output to both the calling and the called telephones 70 and 60 during the instant change of impedance.

Another problem is that while the calling telephone 70 (or a remote terminal 11) is not connected to the called telephone 60 (or a data terminal 13), but a ringing signal coming from the telephone network (not shown) is supplied to the data terminal 13 to cause a bell to ring, if the modem 10 connected to the called telephone 60 is powered-on or reset, the remote terminal 11 attempts to communicate with the data terminal 13 even though the modem 10 is not in a normal operation state. This is because, when the modem 10 is powered-on or reset, an off-hook signal of a pulse type is instantly generated by the controller 20 of the modem 10. Namely, when the modem 10 causes the off-hook signal to be supplied through the telephone line 12 to the remote terminal 11 without a normal detection of a ringing signal, the remote terminal 11 recognizes that the modem 10 on the data terminal part is in a normal operation state, and attempts to communicate with the modem 10. But, since the modem 10 does not detect the normal ringing signal from the ring detector 16 and is not in a normal operation state, the modem 10 can not recognize a command from the remote terminal 11. As a result, the data terminal 13 can not receive data transmitted from the remote terminal 11.

Figure 3:
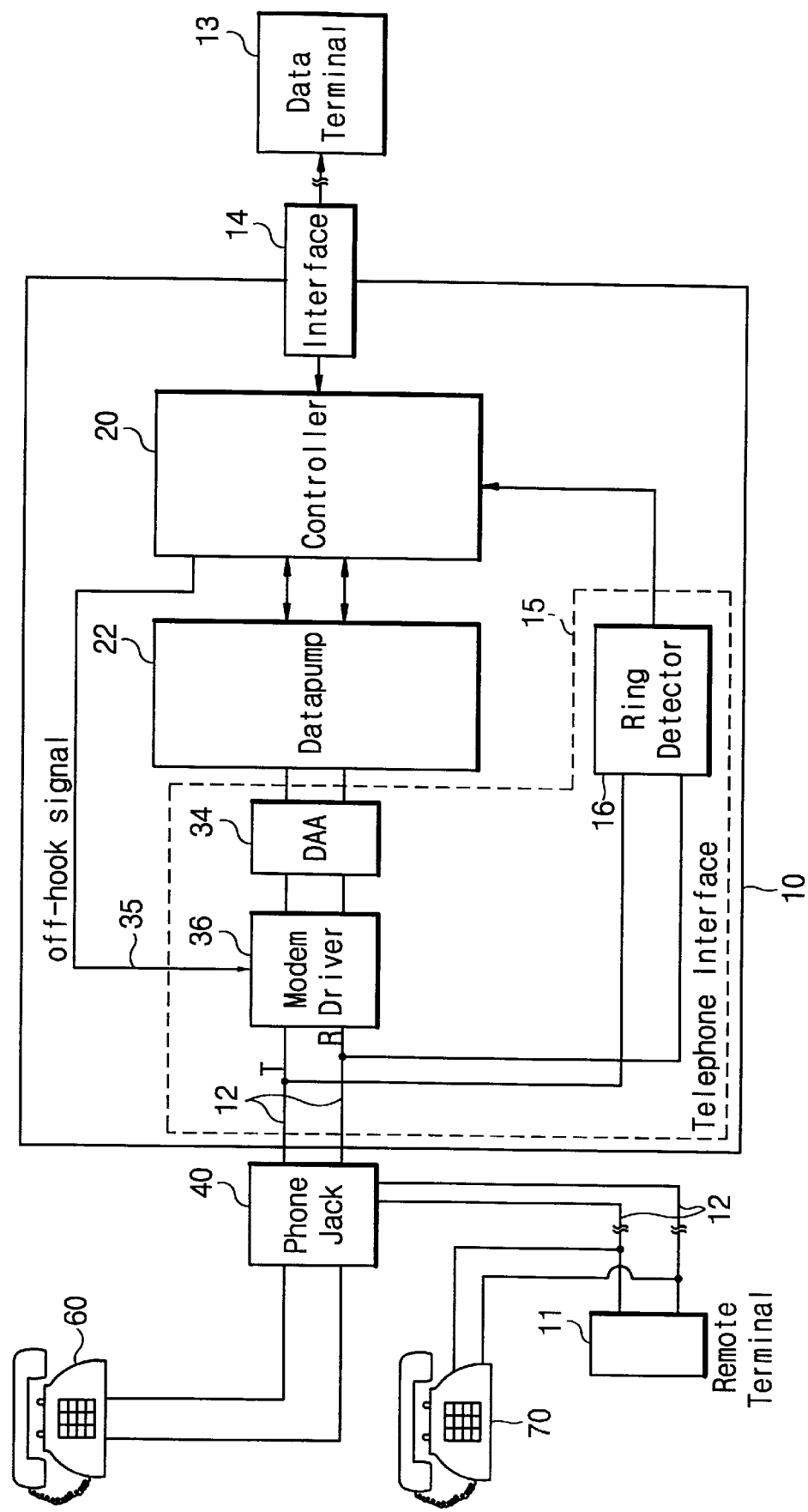
FIG. 3 is a block diagram of a novel modem incorporating the principles of the present invention.

A circuit diagram of a novel telephone interface for a modem incorporating the principles of the present invention is shown in FIG. 3. The modem 10 serves as an interface between a telephone line 12 and a data terminal 13 (e.g., a user's computer) connected by a terminal interface 14 (or a computer interface). A ring signal of an incoming telephone call from a remote terminal 11 (or a remote telephone) to the modem 10 provides an indication of the called party's telephone number being dialed by the calling telephone 70. In the modem 10, a ring detector 16 receives the ring signal associated with an incoming call and converts it into a binary ring signal. Based on the binary ring signal, a controller 20 configures a datapump 22 to process data associated with the incoming call in accordance with the data protocol of the remote calling terminal 11. The controller 20 then directs the telephone interface 15 to answer the incoming telephone call. Namely, the controller 20 generates an off-hook signal 35 indicative of an answer with respect to the ring signal and provides it through a noise eliminating circuit 50 to a modem driver 36 for driving the modem 10. Using the off-hook signal, the controller 20 conducts a minimal handshaking process which may include synchronization data or facsimile signals. The datapump 22 can thus process data flowing between the remote terminal 11 and the local data terminal 13. The noise eliminating circuit 50 is disposed on an off-hook signal line 35 and connected between the modem driver 36 and the controller 20, as shown in FIG. 3.

Figure 5:
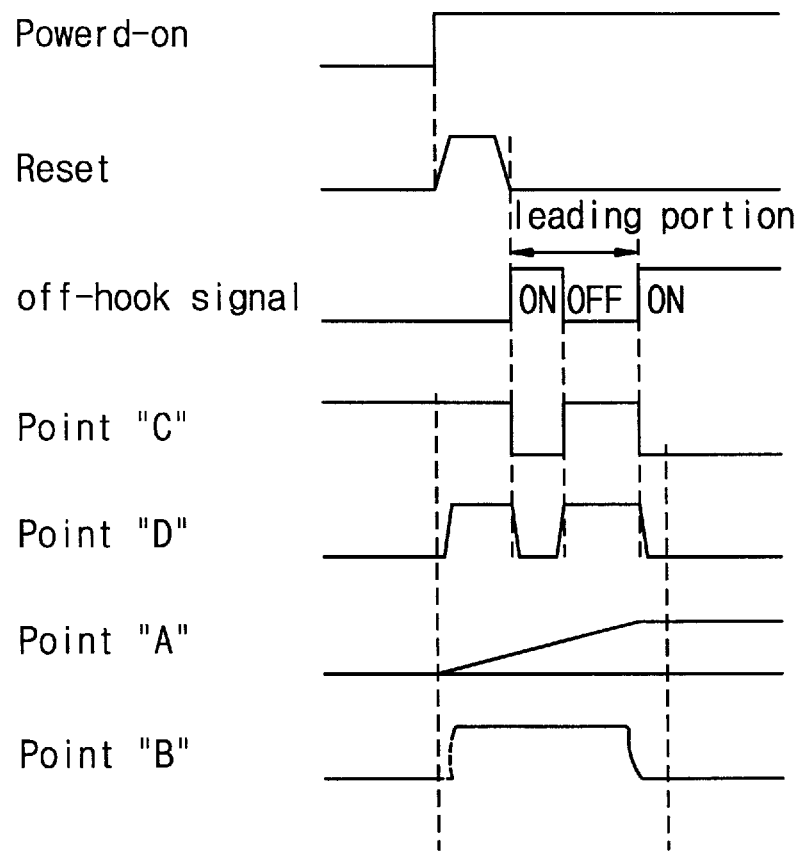
FIG. 5 is a timing chart of input/output signals in the telephone interface shown in FIG. 4.

Also, such an off-hook signal 35 is generated by the controller 20 even when the modem 10 is powered on or reset, as shown in FIG. 5. The off-hook signal 35 has a leading portion of a pulse type which can instantly turn on a transistor Q1 for driving a relay RL. While the transistor Q1 is instantly turned on by the leading portion of a pulse type, the relay RL also is operated. Then the telephone line 12 is instantly connected to the DAA 34 so that an impedance of the telephone line 12 is instantly changed. So, while the calling telephone 70 is communicating with the called telephone 60 through the telephone line 12, if the modem 10 is powered on or reset, a noise may be introduced into the telephone line 12 due to the instant impedance change. It can be understood from the above description that the leading portion of a pulse type constitutes noise.

Such a leading portion of a pulse type of the off-hook signal 35 can be eliminated by the noise eliminating circuit 50. In this embodiment, the circuit 50 is embodied in the telephone interface 15. The circuit 50 may, however, alternatively be embodied in the controller 20.

Figure 4:
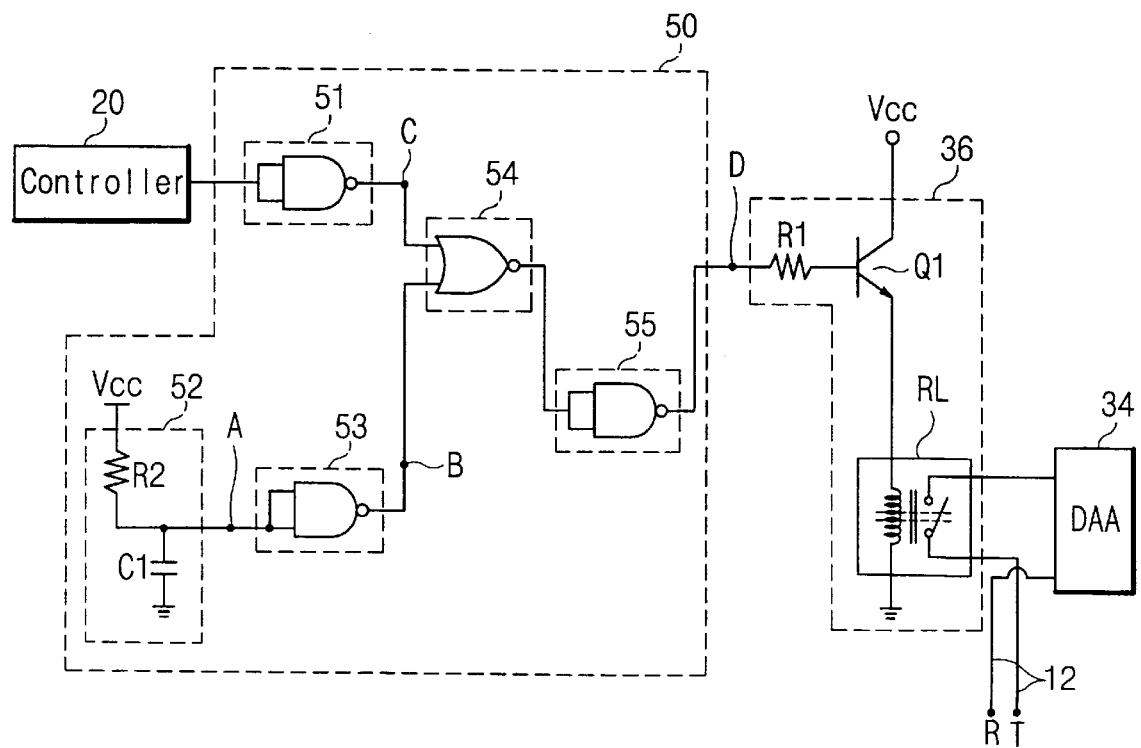
FIG. 4 is a circuit diagram of the telephone interface of the modem shown in FIG. 3.

Referring now to FIG. 4, the noise eliminating circuit unit 50 has an integrated circuit for delaying an off-hook signal for a predetermined time period to provide a delayed off-hook signal to the modem driver 36. The predetermined time period corresponds to an interval of the pulse type leading portion of the off-hook signal. During the predetermined time period, the leading portion is eliminated and is not provided to the modem driver 36. As a result, noise due to the above described impedance change is not introduced into the telephone line 12. Accordingly, even though the calling telephone 70 is communicating with the called telephone 60 through the telephone line 12, no noise is introduced into the telephone line 12 when the modem 10 is powered on or reset. The noise eliminating circuit 50 functions as a delay circuit for delaying the off-hook signal during the predetermined time period to prevent the leading portion of a pulse type from being supplied to the modem driver.

Figure 6A:
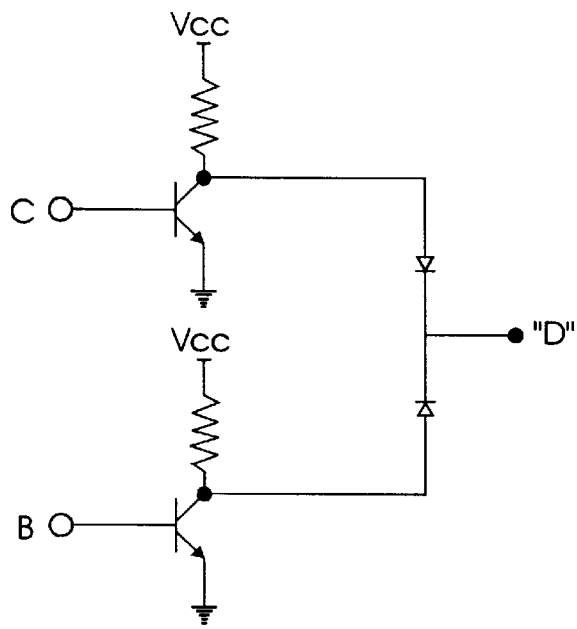
FIGS. 6A through 6C are detailed circuit diagrams showing several types of the logic circuit shown in FIG. 4.
Figure 6B:
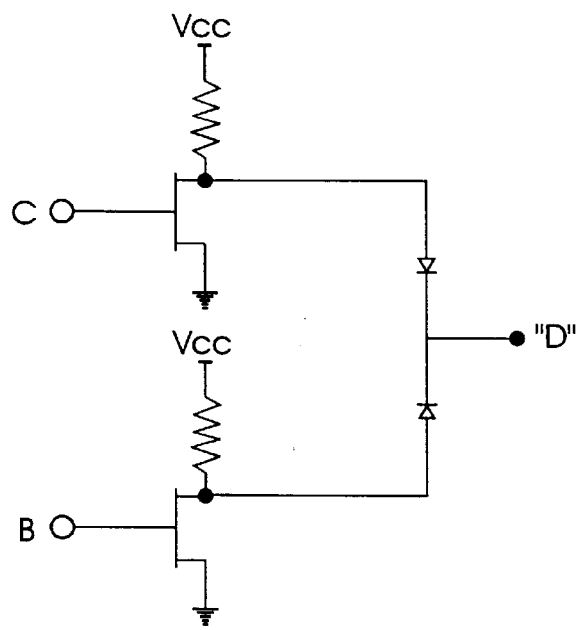
Figure 6C:
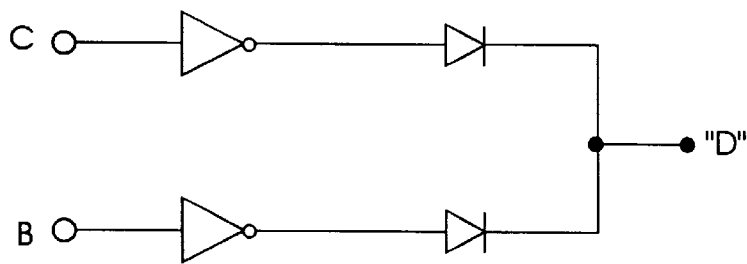

FIG. 4 illustrates a detailed circuit diagram of the noise eliminating circuit 50. The circuit 50 has a first inverter 51 for inversely changing a polarity of an off-hook signal to generate a changed off-hook signal, an integrator 52 for generating an integration signal, a second inverter 53 for inversely changing a polarity of the integration signal to generate a changed integration signal, and a logic circuit for eliminating a leading portion of the reversed off-hook signal while the integration signal from the integrator 52 is at a low level. The logic circuit has an OR gate 54 for receiving the output signals of the first and the second invertors 51 and 53 and a third inverter 55 for inversely changing a polarity of an output signal of the OR gate 54. The integrator 52 has a resistor R2 and a capacitor C1 which determine a time constant. Also, each of the invertors 51, 53, and 55 is composed of a NAND gate whose two input terminals are connected together. The logic circuit shown as elements 54 and 55 in FIG. 4 may also be constituted using two bipolar transistors as shown in FIG. 6A, two FETs (field effect transistors) as shown in FIG. 6B, or two TTL (transistor-transistor logic) devices as shown in FIG. 6C.

It is should be assumed that the modem 10 is powered-on or reset, as illustrated by a timing diagram shown in FIG. 5, and then an off-hook signal from the controller 20 is generated, while the calling telephone 70 is communicating with the called telephone 60 through the telephone line 12. This off-hook signal has a leading portion of a pulse type constituting noise, as shown in FIG. 5. The off-hook signal is supplied through the inverter 51 to an input terminal of the OR gate 54. The other input terminal of the OR gate 54 receives the output signal of the inverter 53.

When the modem 10 is powered on or reset, the integrator 52 starts to integrate a source voltage Vcc. A voltage at a point "A", i.e., a commonly connected input terminal of the inverter 53, is at a low level in accordance with the time constant. After a passage of a predetermined time period, the voltage at the point "A" has gradually increased as shown in FIG. 5 so as to reach a high level. While the voltage at the point "A" is at a low level, the voltage at a point "B", i.e., the output of the inverter 53, is at a high level. Namely, during the high voltage at the point "B", the OR gate 54 always outputs a high level signal regardless of the voltage level of the off-hook signal at a point "C" so that the high level signal from the OR gate 54 is inverted into a low level signal by the inverter 55 and supplied to the base of the transistor Q1. As a result, the transistor Q1 is turned off and the relay RL is switched to an open state. The telephone line 12 connected to the DAA 34 is therefore inoperable, and hence there will be no impedance change on the telephone line 12 while the calling telephone 70 is communicating with the called telephone 60.

After the predetermined time period preset by the integrator 52 has expired, the voltage at the point "A" is at a high level and hence the voltage at the point "B" is changed to a low level signal by the inverter 53. At this time, the voltage at the point "C" is again lowered to a low level by means of the inverter 51 as shown in FIG. 5. As a result, the output of the OR gate 54 is at a low level. This low level signal is changed to a high level signal as the output of the inverter 55. The transistor Q1 is then turned on in accordance with the high level voltage at the point "D". By the transistor Q1 being turned on, the relay RL is switched to a normal closed state. The telephone line 12 connected to the DAA 34 is therefore operable, and hence the local computer 13 can communicate with the remote computer by the modem 10.

As described above, a modem having a telephone interface according to the present invention can eliminate an off-hook signal of a pulse type occurring instantly upon the modem being poweredon or reset. Therefore, no noise is introduced into the telephone line while the telephone of one calling subscriber is connected to the telephone of a called subscriber.

Furthermore, while one telephone of the calling subscriber (e.g., a remote terminal) is not connected to the telephone of the called subscriber (e.g., a data terminal), but a ringing signal is supplied to the data terminal to cause a bell to ring, even though the modem connected to the called telephone is powered-on or reset, a noise of a pulse type is not supplied to the remote terminal through the telephone line. As a result, the remote terminal does not attempt to communicate with the data terminal if the modem is in an abnormal operation state.

What is claimed is:

1. A modem connected to a telephone line and comprising:

a ring detector for receiving a ring signal associated with an incoming telephone call through the telephone line and for converting the ring signal into a binary ring signal;

a datapump for processing the incoming telephone call;

a controller coupled to the datapump and responsive to the binary ring signal from the ring detector, for generating an off-hook signal upon the ring signal being detected, said off-hook signal including a leading portion of a pulse type constituting a noise;

a noise eliminating circuit for eliminating the leading portion of a pulse type included in the off-hook signal and for outputting a noise eliminated off-hook signal; and a modem driver for driving the modem in response to the noise eliminated off-hook signal from the noise eliminating circuit to cause a remote computer to communicate with a local computer connected to the modem or to switch a remote calling telephone to communicate with a local called telephone;

the noise eliminating circuit comprising: a first inverter for inversely changing a polarity of the off-hook signal from the controller; an integrator for generating an integration signal based on a source voltage; a second inverter for inversely changing a polarity of the integration signal, and a logic circuit for eliminating the leading portion of the off-hook signal during a predetermined time period in response to output signals from said first and second inverters.

2. The modem as defined in claim 1, said logic circuit comprising an OR gate for receiving the output signals from said first and the second inverters and a third inverter for inversely changing a polarity of an output signal of the OR gate.

3. The modem as defined in claim 1, said integrator comprising a resistor and a capacitor which together define a time constant corresponding to the predetermined time period.

4. The modem as defined in claim 2, said third inverter comprising a NAND gate having two input terminals which are connected together.

5. A noise eliminating circuit for a modem for eliminating a leading portion of a pulse type noise included in an off-hook signal, the noise eliminating circuit comprising:

a delay circuit for inhibiting a transmission of the off-hook signal during a predetermined time period so as to prevent the leading portion of a pulse type of the off-hook signal from being output;

a first inverter for inversely changing a polarity of the off-hook signal;

an integrator for generating an integration signal based on a source voltage;

a second inverter for inversely changing a plurality of the integration signal; and a logic circuit for eliminating the leading portion of the off-hook signal during a predetermined time period in response to output signals from said first and second inverters.

6. The noise eliminating circuit as defined in claim 5, said logic circuit comprising an OR gate for receiving the output signals from said first and second inverters and a third inverter for inversely changing a polarity of an output signal of the OR gate.

7. The noise eliminating circuit as defined in claim 5, said integrator comprising a resistor and a capacitor which together define a time constant corresponding to the predetermined time period.

8. The noise eliminating circuit as defined in claim 6, said third inverter comprising a NAND gate having two input terminals which are connected together.

* * * * *